(12) United States Patent
Liang et al.

(10) Patent No.: US 8,989,781 B2
(45) Date of Patent: Mar. 24, 2015

(54) PORTABLE ELECTRONIC DEVICE AND POWER-SAVING METHOD THEREFOR

(71) Applicant: HTC Corporation, Taoyuan, Taoyuan County (TW)

(72) Inventors: Yu-Hsin Liang, Taoyuan (TW); Shih-Hung Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 147 days.

(21) Appl. No.: 13/847,894

(22) Filed: Mar. 20, 2013

(65) Prior Publication Data
US 2014/0287777 A1 Sep. 25, 2014

(51) Int. Cl.
*H04W 24/00* (2009.01)
*H04W 52/02* (2009.01)
*H04W 4/02* (2009.01)

(52) U.S. Cl.
CPC .......... *H04W 52/0209* (2013.01); *H04W 4/02* (2013.01); *H04W 52/027* (2013.01); *Y02B 60/50* (2013.01)
USPC ...................... 455/456.3; 455/411; 455/432.1

(58) Field of Classification Search
USPC .................. 455/456.3, 411, 432.1; 340/7.61
See application file for complete search history.

(56) References Cited

U.S. PATENT DOCUMENTS

| 5,548,271 | A  | * | 8/1996  | Tsuchiyama et al. ........ 340/7.61 |
| 6,753,842 | B1 |   | 6/2004  | Williams et al. |
| 7,848,784 | B2 |   | 12/2010 | Roh et al. |
| 8,117,471 | B2 |   | 2/2012  | Chin |
| 2008/0278452 | A1 | * | 11/2008 | Park .............................. 345/173 |
| 2009/0036119 | A1 | * | 2/2009  | Smith et al. ................ 455/432.1 |
| 2011/0054775 | A1 |   | 3/2011  | Snyder |
| 2011/0081889 | A1 | * | 4/2011  | Gao et al. ...................... 455/411 |

FOREIGN PATENT DOCUMENTS

JP          07270749 A    * 10/1995

* cited by examiner

*Primary Examiner* — David Q Nguyen
(74) *Attorney, Agent, or Firm* — Birch, Stewart, Kolasch & Birch, LLP

(57) ABSTRACT

A portable electronic device includes a wireless communication module, a processing unit, a display device and a backlight driver. The wireless communication module wirelessly collects location information from at least one remote station. The processing unit executes a positioning application and thereby calculates a position of the portable electronic device based on the collected location information. The display device operates at a bright mode when the calculated position indicates that the portable electronic device is kept being moved. The backlight driver is coupled to the processing unit, and, the processing unit is further configured to control the backlight driver to make the display device leave the bright mode and enter a dim mode when the calculated position indicates that the portable electronic device is not moved for a first predetermined time period.

19 Claims, 2 Drawing Sheets

PORTABLE ELECTRONIC DEVICE AND POWER-SAVING METHOD THEREFOR

BACKGROUND OF THE INVENTION

1. Field of the Invention

The present invention relates to a portable electronic device, and in particular, relates to a portable electronic device with a GPS module and a power-saving method therefor.

2. Description of the Related Art

Portable electronic devices like PDAs, smart phones or tablets are a huge part of our everyday lives and are increasingly complex nowadays. Many complex functions implemented in the portable electronic devices result in considerable power consumption. One of them is GPS function, by which a portable electronic device could provide a user with position information and/or guide the user to a destination via a map shown on its display. Therefore, power management is usually an important issue in the design of portable electronic devices.

BRIEF SUMMARY OF THE INVENTION

The present disclosure provides a portable electronic device with GPS function and a power-saving method for such a portable electronic device.

A portable electronic device in accordance with an exemplary embodiment of the invention comprises a wireless communication module, a processing unit, a display device and a backlight driver. The wireless communication module is configured to wirelessly collect location information from at least one remote station. The processing unit is configured to execute a positioning application and calculate a position of the portable electronic device based on the collected location information when the positioning application is executed. The display device operates at a bright mode when the calculated position indicates that the portable electronic device is kept being moved. The backlight driver is coupled to the processing unit, and, the processing unit is further configured to control the backlight driver to make the display device leave the bright mode and enter a dim mode when the calculated position indicates that the portable electronic device is not moved for a first predetermined time period. In this manner, considerable power is saved.

In another exemplary embodiment of the invention, a power-saving method for a portable electronic device comprises the following steps: wirelessly collecting location information from at least one remote station; executing a positioning application; calculating a position of the portable electronic device based on the collected location information when the positioning application is executed; making a display device of the portable electronic device operate at a bright mode when the calculated position indicates that the portable electronic device is kept being moved; and making the display device leave the bright mode and enter a dim mode when the calculated position indicates that the portable electronic device is not moved for a first predetermined time period. The dimmed backlight display decreases power consumption.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The description is made for the purpose of illustrating the general principles of the invention and should not be taken in a limiting sense. The scope of the invention is best determined by reference to the appended claims.

Figure 1:
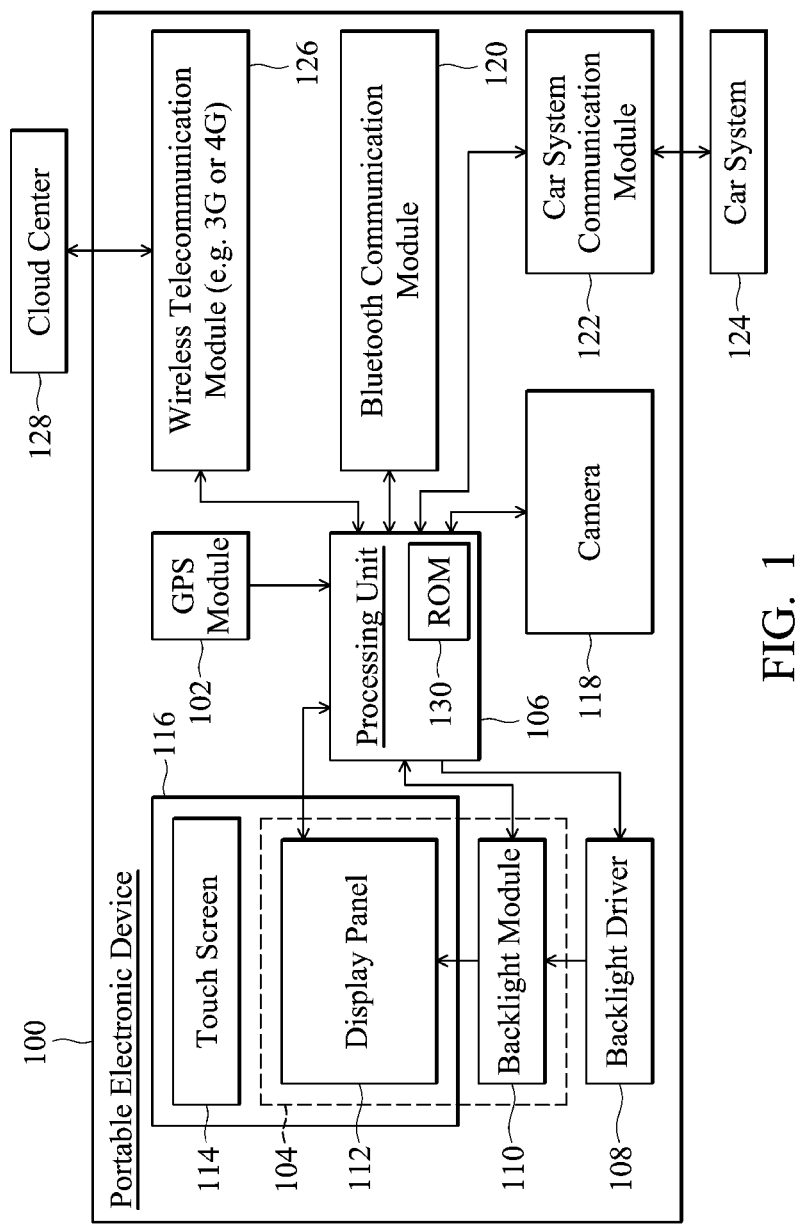
FIG. 1 is a block diagram depicting a portable electronic device in accordance with an exemplary embodiment of the invention.

FIG. 1 is a block diagram depicting a portable electronic device 100 in accordance with an exemplary embodiment of the invention.

The portable electronic device 100 comprises a global positioning system (GPS) module 102 (or any wireless communication module configured to wirelessly collect location information from at least one remote station), a display device 104, a processing unit 106 and a backlight driver 108 coupled to the processing unit 106. The GPS module 102 is configured to collect location information from satellites and send it to the processing unit 106. The processing unit 106 is configured to calculate a position of the portable electronic device 100 based on the collected location information. The display device 104 comprises a backlight module 110 and a display panel 112, e.g. an LCD display panel. The backlight driver 108 is directly or indirectly controlled by the processing unit 106 and configured to drive the backlight module 110 to illuminate the display panel 112 so that the display panel 112 can display images to a user. In this embodiment, the backlight module 110 is capable of generating light with different light levels to illuminate the display panel 112. Further, the display device 104 may operate at three different operation modes, including a bright mode, a dim mode and a fully dark mode.

In the bright mode, the backlight module 110 may illuminate the display panel 112 with a first light level, e.g., a bright light level, so that the display panel 112 displays a bright image to the user. In the dim mode, the backlight module 110 may illuminate the display panel 112 with a second light level, e.g., a dim light level, so that the display panel 112 displays a dim image to the user. In this embodiment, the second light level consumes less power than the first light level in the portable electronic device 100. When the portable electronic device 100 operates at a sleep mode, the display device 104 may enter the fully dark mode, in which the backlight module 110 provides no light to the display panel 112. In addition, the portable electronic device 100 may be waked up from the sleep mode by an interrupt event, e.g., a press of a power button or an incoming call.

In one embodiment, when the processing unit 106 of the portable electronic device 100 executes a positioning application, e.g., GPS application, to guide a user to a preset destination and is kept being moved toward the preset destination, the processing unit 106 keeps calculating an updated position based on the location information continuously collected by the GPS module 102 from satellites. In the meanwhile, the display device 104 operates at the bright mode, in which the backlight module 110 illuminates the display panel 112 with a bright light level so that the display panel 112 can display a bright map with the updated position. In this embodiment, when the portable electronic device 100 is not moved for a predetermined time period (named Tstatic), the processing unit 106 controls the backlight driver 108 to make the display device 104 leave the bright mode and enter the dim mode, in which the backlight module 110 illuminates the display panel 112 with a dim light level so that the display panel 112 displays a dim map with the updated position. Because the display device 104 is not always operated in the bright mode while a GPS application is executed, considerable power is saved by the disclosure. The predetermined time period Tstatic may be set by the user.

According to this embodiment, the portable electronic device 100 may be carried on a driving vehicle, e.g. car, or carried by a user to be moved accordingly.

Further, the processing unit 106 may control the backlight driver 108 according to an interrupt signal so as to make the display device 104 leave the dim mode and return to the bright mode. Several determination conditions to trigger the interrupt signal are discussed in the following paragraphs.

In an exemplary embodiment, the interrupt signal is triggered when an updated position calculated by the processing unit 106 indicates that the portable electronic device 100 starts being moved. In this embodiment, if an updated position is different from previous one, it is indicated that the portable electronic device 100 is kept being moved or starts being moved. On the contrary, if an updated position is the same with the previous one, it is indicated that the portable electronic device 100 is not moved.

In some embodiments, the interrupt signal is triggered by the user.

For example, in FIG. 1, the portable electronic device 100 further includes a touch screen 114 integrated with the display panel 112 to form a touch panel 116. When the touch screen 114 detects a touch from a user, an interrupt signal is triggered to make the display device 104 leave the dim mode and return to the bright mode.

In another exemplary embodiment, the display device 104 can leave the dim mode according to a specific gesture. As shown in FIG. 1, the portable electronic device 100 comprises a camera 118. When the camera 118 extracts a user's specific gesture from images captured by the camera 118, an interrupt signal is triggered to make the display device 104 leave the dim mode and return to the bright mode.

In another exemplary embodiment, the display device 104 can leave the dim mode according to a voice command. As shown in FIG. 1, the portable electronic device 100 comprises a Bluetooth communication module 120. When the Bluetooth communication module 120 detects a voice command received from a remote microphone, e.g., a remote headset having microphone (not shown), an interrupt signal is triggered to make the display device 104 to leave the dim mode and return to the bright mode. In an alternative embodiment, the portable electronic device 100 may comprise a microphone to detect a voice command directly.

In another exemplary embodiment, the display device 104 can leave the dim mode according to a car status. As shown in FIG. 1, the portable electronic device 100 further comprises a car system communication module 122 for communicating with a car system 124 installed in a car. When the user of the car system 124 conducts a parking action, for example, by shifting car's shift level from D to P or a warning indication, for example, by turning on car's warning light, the car system communication module 122 will receive from the car system a notification associated with the parking action or the warning indication and notify the processing unit 106 accordingly so that an interrupt signal is triggered to make the display device 104 leave the dim mode and return to the bright mode.

In other exemplary embodiments, a cloud computing technology may be utilized to trigger the interrupt signal. As shown in FIG. 1, the portable electronic device 100 comprises a wireless telecommunication module 126 (3G or 4G or the like). The portable electronic device 100 wirelessly communicates with a cloud center 128 via the wireless telecommunication module 126. The cloud center 128 may output a backlight-lighten-up command to be received by the wireless telecommunication module 126 based on traffic status. When the backlight-lighten-up command is received by the wireless telecommunication module 126, an interrupt signal is triggered to make the display device 104 leave the dim mode and return to the bright mode. In other exemplary embodiments, the cloud center 128 may further simulate user behavior for generation of the backlight-lighten-up command.

Further, referring to FIG. 1, the processing unit 106 comprises a read only memory (ROM) 130, which stores a ROM code to be executed as a firmware of the portable electronic device 100. The processing unit 106 executes the firmware to implement the aforementioned power management techniques. In an alternatively embodiment, the ROM 130 may be separated from and electrically connected to the processing unit 106. Note that the processing unit of the disclosure is not limited to that shown in FIG. 1. Any microcontroller or computing architecture is suitable to implement the disclosed processing unit.

Figure 2:
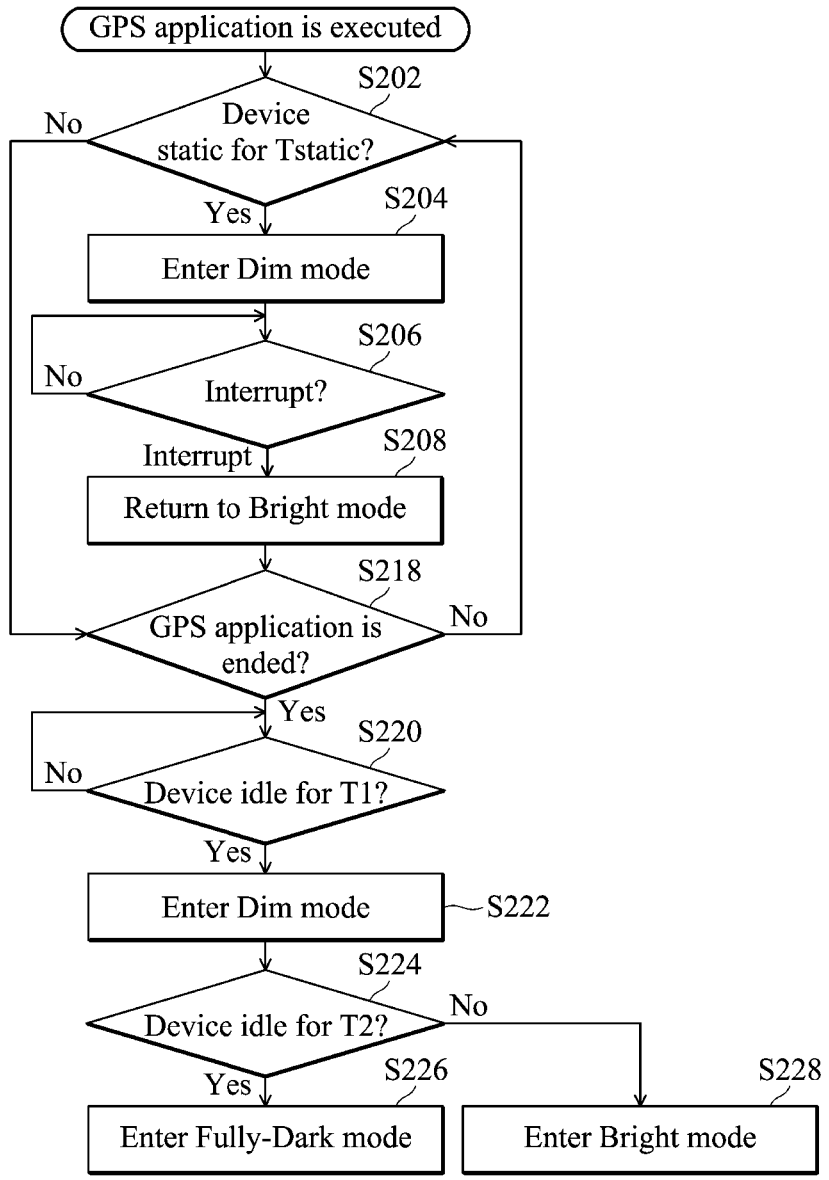
FIG. 2 shows a flowchart depicting a power-saving method for a portable electronic device.

In another exemplary embodiment of the invention, a power saving method for a portable electronic device is disclosed. FIG. 2 shows a flowchart depicting a power-saving method for a portable electronic device. The method is discussed in the following with respect to the block diagram shown in FIG. 1.

When a GPS application is executed, the display device 104 operates at the bright mode and a position of the portable electronic device 100 is calculated by the processing unit 106 based on location information collected by the GPS module 102, and then step S202 is performed to determine whether the portable electronic device 100 is kept static, i.e. not moved, at a position for a predetermined time period Tstatic. When a calculated position indicates that the portable electronic device 100 is kept static, i.e. not moved, at a position for the predetermined time period Tstatic, step S204 is performed to control the backlight driver 108 to make the display device 104 leave the bright mode and enter the dim mode. In the dim mode, when it is determined in step S206 that an interrupt signal is triggered, step S208 is performed to control the backlight driver 108 to make the display device 104 leave the dim mode and return to the bright mode. On the other hand, when no interrupt signal is triggered, step S206 is repeated.

Further, when it is determined in step S202 that the portable electronic device 100 is not kept static at the position for the predetermined time period Tstatic (e.g., only kept static for a time shorter than time period Tstatic), step S218 is performed to determine whether the GPS application is ended. If the GPS application is not ended, step S202 is performed. On the other hand, when it is determined in step S218 that the GPS application is ended, step S220 is performed to check whether the portable electronic device 100 is kept idle for a predetermined time period T1. If yes, step S222 is performed to control the backlight driver 108 to make the display device 104 switch from the bright mode to the dim mode (i.e., enter dim mode). If no, step S220 is repeated. After the display device 104 switches to the dime mode in step S222, step S224 is performed to check whether the portable electronic device 100 is kept idle for a predetermined time period T2. If yes, step S226 is performed to control the backlight driver 108 to make the display device 104 switch from the dim mode to the fully dark mode so that the portable electronic device 100 may enter the sleep mode. If no, step S228 is performed to control the backlight driver 108 to make the display device 104 leave the dim mode and enter the bright mode.

Please note that according to another embodiment of the present disclosure, the global positioning system (GPS) module 102 described above may be implemented by other wireless communication module, e.g., by wireless telecommunication module 126, to wirelessly collect location information from other remote stations, e.g., base stations, and send the collected information to the processing unit 106 for calculating a position of the portable electronic device 100.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
    a wireless communication module configured to wirelessly collect location information from at least one remote station;
    a processing unit configured to execute a positioning application, and calculate a position of the portable electronic device based on the collected location information when the positioning application is executed;
    a display device configured to operate at a bright mode or a dim mode, wherein the display device operates at the bright mode when the calculated position indicates that the portable electronic device is kept being moved; and
    a backlight driver coupled to the processing unit, wherein the processing unit is further configured to control the backlight driver to make the display device leave the bright mode and enter the dim mode when the calculated position indicates that the portable electronic device is not moved for a first predetermined time period,
    wherein when the positioning application is ended and the portable electronic device is kept idle for a second predetermined time period, the processing unit further controls the backlight driver to make the display device switch from the bright mode to the dim mode.

2. The portable electronic device as claimed in claim 1, wherein the display device further comprises a display panel and a backlight module, and the backlight module is configured to illuminate the display panel with a bright light level for displaying a map in the bright mode or to illuminate the display panel with a dim light level for displaying the map in the dim mode.

3. The portable electronic device as claimed in claim 1, wherein before the positioning application is ended the processing unit is further configured to control the backlight driver to make the display device leave the dim mode and return to the bright mode according to an interrupt signal.

4. The portable electronic device as claimed in claim 3, wherein the interrupt signal is triggered when the position calculated by the processing unit indicates that the portable electronic device starts being moved.

5. The portable electronic device as claimed in claim 3, further comprising:
    a touch screen integrated with the display device, wherein the interrupt signal is triggered when the touch screen detects a touch.

6. The portable electronic device as claimed in claim 3, further comprising:
    a camera, wherein the interrupt signal is triggered when the camera extracts a specific gesture from images captured by the camera.

7. The portable electronic device as claimed in claim 3, further comprising:
    a Bluetooth communication module, wherein the interrupt signal is triggered when the Bluetooth communication module detects a voice command received from a remote microphone.

8. The portable electronic device as claimed in claim 3, further comprising:
    a car system communication module, wherein the portable electronic device is configured to communicate with a car system installed in a car, and
    wherein the interrupt signal is triggered when the car system communication module receives a notification from the car.

9. The portable electronic device as claimed in claim 3, further comprising:
    a wireless telecommunication module configured to wirelessly communicate with a cloud center, and
    wherein the interrupt signal is triggered when the wireless telecommunication module receives from the cloud center a backlight-lighten-up command based on traffic status.

10. The portable electronic device as claimed in claim 1, wherein when the portable electronic device is further kept idle for a third predetermined time period after switching to the dim mode, the processing unit further controls the backlight driver to make the display device switch from the dim mode to a fully dark mode.

11. A power-saving method for a portable electronic device, which has a display device, the method comprising:
    wirelessly collecting location information from at least one remote station;
    executing a positioning application;
    calculating a position of the portable electronic device based on the collected location information when the positioning application is executed;
    making the display device operate at a bright mode when the calculated position indicates that the portable electronic device is kept being moved;
    making the display device leave the bright mode and enter a dim mode when the calculated position indicates that the portable electronic device is not moved for a first predetermined time period; and
    making the display device switch from the bright mode to the dim mode when the positioning application is ended and the portable electronic device is kept idle for a second predetermined time period.

12. The power-saving method as claimed in claim 11, further comprising:
    before the positioning application is ended, making the display device leave the dim mode and return to the bright mode according to an interrupt signal.

13. The power-saving method as claimed in claim 12, further comprising: triggering the interrupt signal when the calculated position indicates that the portable electronic device starts being moved.

14. The power-saving method as claimed in claim 12, further comprising:
    triggering the interrupt signal when a touch screen of the portable electronic device detects a touch.

15. The power-saving method as claimed in claim 12, further comprising:
    triggering the interrupt signal when a camera of the portable electronic device extracts a specific gesture from images captured by the camera.

16. The power-saving method as claimed in claim 12, further comprising:

triggering the interrupt signal when a Bluetooth communication module of the portable electronic device detects a voice command received from a remote microphone.

17. The power-saving method as claimed in claim 12, further comprising:
    building a communication between the portable electronic device and a car system installed in a car; and
    triggering the interrupt signal when the car system communication module receives a notification from the car.

18. The power-saving method as claimed in claim 12, further comprising:
    using a wireless telecommunication module of the portable electronic device to wirelessly communicate with a cloud center; and
    triggering the interrupt signal when the wireless telecommunication module receives from the cloud center a backlight-lighten-up command based on traffic status.

19. The portable electronic device as claimed in claim 11, further comprising:
    making the display device switch from the dim mode to a fully dark mode when the portable electronic device is further kept idle for a third predetermined time period after switching to the dim mode.

* * * * *